343-909. XR 3553694 SR

Jan. 5, 1971 T. D. CLARK 3,553,694

WAVE GENERATOR

Filed Feb. 24, 1969

INVENTOR.
TERENCE DANIEL CLARK
BY
Frank L Infosino
AGENT

United States Patent Office 3,553,694
Patented Jan. 5, 1971

1 2

3,553,694

WAVE GENERATOR

Terence Daniel Clark, Lewes, Sussex, England, assignor to U.S. Philips Corporation, New York, N.Y., a corporation of Delaware Filed Feb. 24, 1969, Ser. No. 801,366
Int. Cl. H01q 3/22; H03b 15/00
U.S. Cl. 343—100 7 Claims

ABSTRACT OF THE DISCLOSURE

A superconductive Josephson junction wave generator comprising a plurality of superconductor ball elements arranged in a two dimensional array between a pair of electrical contacts with a layer of non-superconductor material between the balls to form the junction. A DC voltage applied to the contacts will produce electromagnetic radiation at very high frequencies.

This invention relates to an arrangement for generating or detecting electromagnetic radiation by means of an array of a plurality of Josephson junctions.

In 1962, a paper was published in Physics Letters, volume 1, page 251, by B. D. Josephson, entitled Possible New Effects in Super-conductive Tunnelling. The paper predicted that a super-current could be passed through a thin film of insulator separating two super-conducting bodies without developing a voltage across it. The effect has been experimentally carried out for a film less than 20 A. thick.

A quasi-particle tunnelling will take place if the barrier is too thick by a small amount for the zero-voltage tunnelling. In this case a voltage is developed which is virtually independent of the tunnelling current. This same voltage is also developed if a certain magnetic field is applied or if a certain tunnelling current is exceeded.

B. D. Josephson also predicted an emission of radiation at a frequency $f=2eV/h$ (and harmonics) when a direct voltage V is applied to a Josephson junction, $h$ being Planck's constant and $e$ being the electronic charge (equivalent to 487 mHz. per microvolt). Moreover he predicted the converse, whereby incident radiations at this frequency (and at multiples of it) would cause sudden increases in the DC voltage for zero changes in tunnelling DC supercurrent (zero impedance steps).

According to experiments reported by I. K. Yanson and V. M. Svistunov in Soviet Physics Journal of Experimental and Theoretical Physics, vol. 20, No. 6, June 1965, pages 1404–1411, and by Shapiro in Physical Review Letters, vol. 11, 1963, page 80, entitled "Josephson Currents In Superconductive Tunnelling," a junction radiated about $10^{-12}$ watts at the predicted frequency. Instead of a layer contact a point-contact Josephson junction has been found by Zimmerman and Silver (Physical Review vol. 141, No. 1, January 1966, pp. 367–375) to radiate somewhat more strongly, but the improvement was insufficient to use in a practical transmitter.

It was felt very desirable that practical arrangements for transmitting and receiving be developed because the Josephson A.C. effect apparently enables frequencies higher than millimetre wave frequencies, even up to the infra-red optical range, to be transmitted and received simply by raising the direct voltage appropriately. Mankind has at present no generator useful for these frequencies.

It has been proposed to use an array of many Josephson junctions DC-energized in parallel to raise the AC power available, this may also increase the receiving sensitivity. However the measurement of small DC voltage variations in a circuit comprising many junction in parallel, each of them of almost zero resistance, may be very difficult.

If all the parallel-fed junctions are layer contacts, relatively high currents must be passed ineffectually in the interior of each junction, since only the edges of the junction are exposed and able to receive or radiate.

If they are point-contacts it is very difficult to control the junction pressures and thicknesses, i.e. the geometry of each will be different. This is most undesirable and may necessitate individual adjustment of each.

The main object of the invention is to avoid the above-mentioned defects, difficulties and poor practical performance. Accordingly the inventive transmitting or receiving array is *characterized* by superconductive balls held together or nearly together with non-superconductive matter in between, allowing Josephson tunnelling, and so terminated for applying a voltage that chains of many balls are energizable in series, preferably with each Josephson junction in parallel with other such ball-contact Josephson junctions of the array.

Such bridging of each junction eliminates the risk of one whole chain being made useless by a single junction-failure. It is found that a very small clearance, i.e. no actual touching, is permissible perhaps because air is the tunnelled layer, but even if the clearance is somewhat excessive, its shunting by another junction not only completes the series-chain but also sometimes enables the dubious junction to perform. This last may be due to a phase coherence given by the very near shunting junction, or given by the substantially superconductive interconnections. Thus, in the array there may be many such "weak links" performing adequately. Each ball may thus belong to several chains.

If the balls are all pressed together by a single adjustable clamping force, it is quite easy to control simultaneously the pressure between all the balls. This then provides a means for adjusting the thicknesses of the barriers tunnelled, e.g. when these are oxide films on aluminum, all at the same time for achieving the optimum performance.

Ball-to-ball contacts also provide a very advantageous contact geometry because the radiation can (in contrast with layer junctions) easily pass in or out (there being a gradually expanding or contracting radiative cross-section) and because the contacting surfaces are robust compared with point contacts.

It is also an advantage that the balls provide radiatively communicant spaces between junctions due to the pin-cushion-shaped interstices particularly in three dimensional arrays. The radiative cross-coupling tends to lock all the phases together.

If also the series chains are all geometrically parallel to each other, this phase coherence provides the possibility of forming radiative lobes and hence a directive effect, according to the ball size and the wavelength.

The materials of the balls may be important; each super-conductive material has a preferred radiating or receiving frequency where it is most efficient. The radiating frequency will of course be adjustable over a range above and below the preferred frequency by means of D.C. voltage changes but the *preferred* wavelength is only adjustable by changing the material at both sides or one side of the junction. Tin on both sides will differ from aluminum on both sides, and a $Sn/Al_2O_3/Al$ system will be different again re preferred frequency. Balls of alloyed superconductors and combinations thereof provide more possibilities, and may also render the preferred frequency less peaky, i.e. more broadbanded operation is enabled.

It is also possible to couple separate spaced arrays together by radiation (waveguide) and by inter-connecting them with superconductors leading to the same D.C. voltage source. This can be used with linear arrays to provide frequency multiplication due to the high harmonic content of the Josephson junction radiations. The typical direct voltage rise is noted not only during reception of the fundamental frequency but also if one or another harmonic is being received. Thus a second array may be arranged to give a fundamental at three times the fundamental frequency of a first array. The third harmonic of the first array will then stimulate the second, perhaps if sufficient phase control can be kept via an oversized waveguide. All the arrays can be planar and parallel.

Arrays can be seen in the accompanying drawings, in which.

Figures 1, 2:
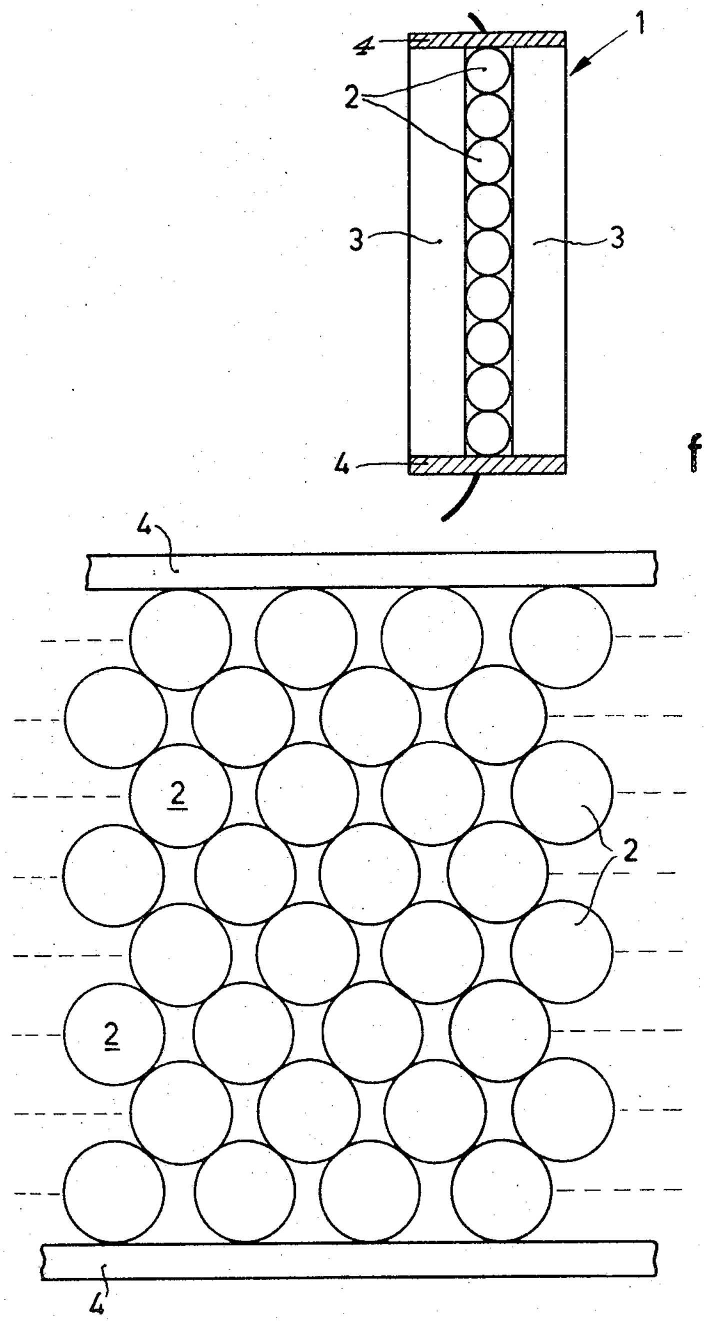
FIG. 1 shows one two-dimensional array of balls and energizing terminals.
FIG. 2 shows another 2D array.

Referring to the drawing, FIG. 1 illustrates in side view a device 1 comprising a planer (2–D) array of tin balls 2 (only the nearest column being visible) enclosed between two slabs 3 of polytetrafluorethylene, which form a microwave window on each side of the array. Strip superconductors 4 in contact with the highest and lowest rows of balls as viewed in the figure form electrodes for the device. The balls may be of 0.1 mm. diameter. A tin ball forms a relatively insulating surface layer, and strip conductors 4 can be urged towards each other adjustably by means (not shown) to compess all the layers in unison, and thus controlledly to vary their thicknesses. If the thickness of the insulating layers exceeds a certain maximum, Josephson tunnelling cannot occur. Adjustability of the compression together of balls 2 gives simultaneous fine control within limits of all the layers.

The output frequency of any one of the junctions is directly proportional to the voltage across it. The directive pattern of a row of similiar, regularly spaced emitting aerials depends on the phase relationship between the outputs, on the Josephson frequency and on the diameter of the balls, since the latter almost completely determines the pitch of the emitting junctions in a closely packed square matrix.

Each junction can radiate $10^{-7}$ watts at its "preferred" wavelength whereas known junctions only gave $10^{-12}$ watts. The improvement per junction is therefore $10^5$. In addition many more junctions can be contained in 1 $cm.^2$.

If the diameter of each ball is equal to one half wavelength, and all phases are the same, the array radiates most strongly in a direction normal to its plane. Therefore 0.1. mm. balls would broadside best at 0.2 mm. wavelength, and a 1 $cm.^2$ array gives over 1 miliwatt of this ultra-microwave power. The voltage across the array is 308 mv.

When receiving (radiation) power, a DC voltage may have to be provided and increments therein will prove that incident radiation exists. Alternatively DC conductance changes can be measured. The increments in voltage may appear on almost zero "starting" voltage, or the increments in current measured at the controlled given voltage corresponding to operating frequency.

In the embodiment of FIG. 1 each junction is shunted by others and this is calculated to help to lock all the phases and also to enable a series chain formed by a column to continue functioning even though one (or more) contacts therein be too weak to form, on its own, an effective Josephson junction. Not only is it shunted, so that the rest of the column is tunnelled, but sometimes it is even able to radiate itself.

In the first embodiment, all the series chains are vertical, i.e. the colums of the matrix, but FIG. 2 shows an embodiment, which can also be planar, in which the chains extend at 45° to the vertical direct line between the terminal superconductors 4, 4. In this case, also, the junctions are shunted by other junctions. Only a simplified version of a practical array is shown, so that the principle is apparent.

In FIGS. 1 and 2, the two arrays are planar (2–D), but a 3D array can easily be arranged by using many similar 2D arrays, one behind the other. Although some of the interior junctions cannot radiate directly outwards, the phase locking is increased by their presence. The 3D configuration gives pincushion-shaped radiative cross-coupling spaces.

Furthermore the balls may be crammed into a less regular space, e.g. a closed cylinder, so that the series chains are not straight, or controlled. The cylinder can have a plurality of regular spaced slot antennas to allow radiation in or out. The ends of the cylinder can form the terminals and be pressed inwards to compress and cram together all the balls.

If two or more separate and spaced 2D arrays, such as are shown in FIG. 1 or 2, are arranged geometrically and electrically parallel to each other, with a waveguide inter-connecting their radiations, the superconductors and the waveguides provide two sorts of inter-coupling. The first array can then have its transmitting frequency multiplied by the other arrays due to the harmonic-rich property of the Josephson radiation.

What is claimed is:

1. A superconductor device for radiating or receiving electromagnetic energy comprising, a plurality of ball elements composed of a superconductive material, means for holding said balls together with a layer of non-superconductor material between the balls so as to form a plurality of superconductive Josephson junctions that allow Josephson superconductive tunnelling between superconducting balls, and means for electrically terminating the balls so that chains of balls can be electrically energized in series and with each Josephson junction energized in parallel with other ball contact Josephson junctions in the device.

2. A device according to claim 1 wherein said terminating means comprises two terminal members for sandwiching all the ball together as well as allowing electrical access, said terminal members being adjustable in their separation distance by a varying clamping force.

3. A device according to claim 1 wherein said holding means is arranged to hold said balls to form a two dimentional array, the frequency and size of the balls being chosen to provide a directional radiation pattern broadside to said two dimensional array of balls.

4. A device according to claim 1 wherein the balls are composed of different superconductor materials, so that the operating frequency is a "preferred" frequency.

5. A device according to claim 1 wherein said holding means is arranged to hold said balls to form at least two spaced apart two dimensional arrays that are energized in parallel and radiatively connected together by waveguides so that frequency multiplication occurs.

6. A device according to claim 1 further comprising a source of DC voltage coupled to said electrical terminating means.

7. A device according to claim 1 wherein said terminating means comprises first and second spaced apart planar terminal members arranged to sandwich the balls there-between to form a plurality of diagonally arranged chains of balls in series between said first and second members.

References Cited

UNITED STATES PATENTS 3,423,607 1/1969 Kunzler ------------- 307—306

OTHER REFERENCES

Langenberg, D.N. et al. Josephson-Type Superconducting Tunnel Junctions as Generators of Microwave and Submillimeter Wave Radiation. In Proceedings of the IEEE. 54(4): pp. 560–575. April 1966.

RODNEY D. BENNETT, Jr., Primary Examiner

T. H. TUBBESING, Assistant Examiner

U.S. Cl. X.R.

307—306; 331—107; 343—854, 909